United States Patent [19]

Crowther et al.

[11] Patent Number: 4,814,412
[45] Date of Patent: Mar. 21, 1989

[54] TWO COMPONENT POLYURETHANE SYSTEM FOR CASTING EXPANDED POLYTETRAFLUOROETHYLENE

[75] Inventors: Glenn W. Crowther, Newark, Del.; Christopher T. Hyde, Lincoln University, Pa.; Robert L. Henn, Wilmington, Del.

[73] Assignee: W. L. Gore & Associates, Inc., Newark, Del.

[21] Appl. No.: 134,018

[22] Filed: Dec. 17, 1987

[51] Int. Cl.$^4$ .............................................. C08G 18/61
[52] U.S. Cl. ................................. 528/28; 427/393.5; 428/306.6; 428/308.4; 528/48; 528/76; 528/77; 528/83; 528/58
[58] Field of Search .................... 528/28, 48, 76, 77, 528/83, 58; 427/393.5; 428/306.6, 308.4

[56] References Cited

U.S. PATENT DOCUMENTS

| | | | |
|---|---|---|---|
| 3,362,921 | 1/1968 | Erhlich et al. | 260/18 |
| 3,663,513 | 5/1972 | Kazama et al. | 260/75 |
| 3,697,483 | 10/1972 | Damusis | 260/75 |
| 4,131,604 | 12/1978 | Szycher | 528/79 |
| 4,131,605 | 12/1978 | Ammons | 528/77 |
| 4,131,606 | 12/1978 | Ammons | 528/77 |
| 4,243,760 | 1/1981 | McDaniel et al. | 521/176 |
| 4,329,442 | 5/1982 | Pokorny | 528/49 |
| 4,367,327 | 1/1983 | Holker et al. | 528/61 |
| 4,383,099 | 5/1983 | Hajimichael et al. | 528/60 |
| 4,745,170 | 5/1988 | Bushman et al. | 528/76 |

FOREIGN PATENT DOCUMENTS 0052915  6/1982  European Pat. Off. .
3135672.9  3/1983  Fed. Rep. of Germany .
2068393A  10/1979  United Kingdom .

Primary Examiner—Maurice J. Welsh
Attorney, Agent, or Firm—Morgan & Finnegan

[57] ABSTRACT

The present invention provides a two component polyurethane system with excellent wetting properties for casting a supported or unsupported, expanded polytetrafluoroethylene structure. It consists essentially of a polyisocyanate component having an isocyanate functionality of 2.2 or less and a polyol blend having an overall hydroxyl functionality of 2.2 or less and a viscosity of less than 500 cps., preferably 200 cps. or less. The polyol blend consists essentially of (i) a linear polyether or polyester (about 200–2500 molecular weight), (ii) a diol or triol (less than 200 molecular weight), and (iii) a catalyst in an amount sufficient to provide gelling at greater than 2 minutes and less than 10 minutes. The isocyanate to hydroxyl ratio is between 0.95:1 and 1.10:1. In some cases, it is desirable to include selected siloxane surfactants when polyol blends with the higher viscosities, i.e., about 200–500 cps., are used. The casting system is useful for making membrane filters.

34 Claims, 1 Drawing Sheet

TWO COMPONENT POLYURETHANE SYSTEM FOR CASTING EXPANDED POLYTETRAFLUOROETHYLENE

BACKGROUND OF THE INVENTION

The present invention relates to a low-viscosity two-component polyurethane system for casting an expanded (i.e., porous) polytetrafluoroethylene structure in conventional manufacturing equipment.

The prior art describes two component polyurethane systems for casting, i.e., potting, molding or encapsulating. Solvent-free polyurethane casting systems are useful for embedding electrical parts, for sealing the ends of cables, for producing homogeneously soldered accumulators, and in grouting compositions.

The components are not mixed until reaction is desired. On mixing the isocyanate and hydroxyl-containing components react to form the polyurethane product. Non-reactive components can be incorporated in one of the reactive components.

One type of two component polyurethane system consists of a polyol component and an isocyanate component; the other type consists of a prepolymer component and a curative component. The prepolymer is usually excess isocyanate reacted with a lesser amount of polyol with more of the same or a different polyol as the curative component; alternatively the prepolymer is excess polyol reacted with a lesser amount of isocyanate and the curative component is more of the same or a different isocyanate. These systems can be used to make articles comprising a flexible or rigid polyurethane, a supported or unsupported expanded polytetrafluoroethylene structure, and optionally a housing.

An example of a commercial system is a polymeric methylene diphenylene diisocyanate (polymeric MDI) and polypropylene glycol system marketed under the name "CONOTHANE EN-21" (registered trademark of Conap, Inc.) which has a mix viscosity of 2000 centipoise (cps.) and an isocyanate-polyol mix ratio of 1 to 1.16. Another example is a polyether prepolymer end capped with toluene diisocyanate and a polyether curative component, designated "PRC 1564" and available from Products Research and Chemical Corp., which has mix viscosity of 8000 cps. and a prepolymer-polyol mix ratio of 1 to 0.08. These systems illustrate the high final viscosities usually associated with prepolymers. These systems are useful in potting and encapsulation applications, for example, as electrical insulation for electrical assemblies. "Low viscosity" is a relative term. West German Pat. No. 3,500,722 (1986) describes a material having a viscosity of 9600 cps. at room temperature. Viscosities in the ranges described above are sometimes referred to as "low". However, in certain demanding applications where wetting and penetration of a substrate which has a very fine microstructure must occur, these polyurethane casting systems are not satisfactory. A working viscosity an order of magnitude lower is required for good flow characteristics.

West German Patent Application No. P 31 35 672.9, filed September 9, 1981, and published March 24, 1983, relates to the application of low-viscosity, easily castable mixtures which self-cure to polyurethane at low temperatures (under 50° C.) for intermediate layers in laminated safety plates. The mixtures are characterized by the fact that the viscosity of both the individual components and the entire mixture lies below 600 cps./25° C. and that the mixture consists of:
 (a) linear propylene oxide ethers ranging in molecular weight from 800 to 4000 (preferably from 1000 to 2500) that may contain up to 15 mol. % ethylene oxide units,
 (b) multifunctional propylene oxide polyethers ranging in molecular weight from 250 to 1250 (preferably from 400 to 800) that may contain up to 15 mol. % ethylene oxide units,
 (c) cycloaliphatic diisocyanates,
 (d) 0.05 to 2.5 percent by weight of organic tin catalysts in the mixture and, if necessary,
 (e) conventional additives, with the ratio of (a) to (b) being 1:1 to 16:1 and the NCO/OH ratio (c)/(a)+(b) measuring 0.8 to 1.3.

In these formulations, significant amounts of trifunctional glycols are used such that the resulting polyol blends have hydroxyl functionalities greater than 2.5.

The disadvantage of using a trifunctional compound, such as that used in German Patent Application No. 31 35 672.9, is early gellation. In addition, the resulting polymers have long cure times (e.g., 4 hours), and are very soft having a Shore A hardness of 10–80.

As used herein, low viscosity is defined as equal to less than 500 cps. at room temperature when measured as described hereafter. When viscosities this low are required, many polyurethane casting systems which utilize prepolymers or high molecular weight components cannot be used because of their inherently higher viscosities.

When viscosities less than 500 cps. are required, particularly when the preferred viscosity of less than 200 cps. is required, certain inherent difficulties are present. Low molecular weight polyols are very susceptible to moisture absorption and contamination. When the polyol is contaminated, even by small amounts of water, bubble-free castings cannot be produced since the water reacts with the isocyanate and releases carbon dioxide. Current production procedures often require daily degassing of the polyol components which is inconvenient, time consuming, and expensive.

Water absorption is a problem common to all polyols having high hydroxyl numbers, i.e., polyols having a high hydroxyl number. Water solubility in di- and trifunctional polyols declines with increasing molecular weight, and it is higher for trifunctional than difunctional polyols. For example, with difunctional polypropylene glycols having molecular weights of 425, 760, 1000, and 2000 the water solubilities are 100, 0.2, 0.23, and 0.17% (weight of water per weight of polyol), respectively. For example, with trifunctional polypropylene glycols having molecular weights of 260, 725, 1000, 2000, and 5000 the water solubilities are 100, 25, 22, 4 and 2.5%, respectively. The trifunctional polypropylene glycols of West German patent application No. P 31 35 672.9 are 25 to 100% water-soluble.

Another constraint which arises in formulating these systems is the ratio in which the components must be mixed. Mixing can be done most simply and economically using a single motor to drive two identical gear pumps, piston pumps, or diaphragm pumps to meter the two components into the mixing apparatus. Ratios other than 1:1 may require significantly more complicated and expensive equipment, such as two synchronized variable speed motors to drive two separate pumps of different capacities if the required ratio deviates significantly from 1 to 1.

There is therefore a need for a low viscosity two component polyurethane casting system with good wetting properties, preferably a system which can be used at a 1 to 1 volume ratio.

SUMMARY OF THE INVENTION

The present invention provides a two component polyurethane system for casting a supported or unsupported, expanded polytetrafluoroethylene structure. The system is characterized by its ability to wet the polytetrafluoroethylene structure in two minutes or less. It consists essentially of component A which is a polyisocyanate having an isocyanate functionality of 2.2 or less and component B which is a polyol blend having an overall hydroxyl functionality of 2.2 or less and having a viscosity of less than 500 cps., preferably 200 cps. or less. The polyol blend consists essentially of (i) a linear polyether or polyester diol having a molecular weight of about 200–2500, (ii) a diol or triol having a molecular weight of less than 200, and (iii) a catalyst for the isocyanate-hydroxyl reaction to form the polyurethane, the catalyst being present in an amount sufficient to provide gelling at greater than 2 minutes and less than 10 minutes. The amounts of Component A and Component B are adjusted so that an isocyante to hydroxyl ratio between 0.95 to 1 and 1.10 to 1 is provided. In some cases, it is desirable to include selected siloxane surfactants when polyol blends with higher viscosities, i.e., about 200–500 cps. are used.

The invention further provides a method for casting the supported or unsupported, expanded polytetrafluoroethylene structure using the two component polyurethane system and articles of manufacture, e.g., membrane filters.

BRIEF DESCRIPTION OF THE DRAWING

Drawing 1 shows a cross section of the filitration assembly described in Example 8. The frame is constructed from rigid polyvinyl chloride with a flanged lip (B) on the edges. This serves as a cavity to contain the polyurethane mixture during the casting operation. The frame has $\frac{1}{8}$ inch diameter holes (C) drilled in the bottom on $\frac{1}{2}$ inch centers to allow flow of gases or liquid through the filter medium (A). The filter medium is adhered with a polyurethane casting (D) to the frame. Drawing 2 shows a top view of the same filtration assembly as described in Example 8 and depicted in drawing 1. The frame has internal dimensions of 4" by 5" on which a 4" by 5" filter media of expanded polytetrafluorethylene with a Frazier number of 6 feet per min at $\frac{1}{2}$" of water back pressure is placed. The line E-E' shows the plane of the cross section in drawing one.

DESCRIPTION OF THE PREFERRED EMBODIMENTS INVENTION

Figure 1:
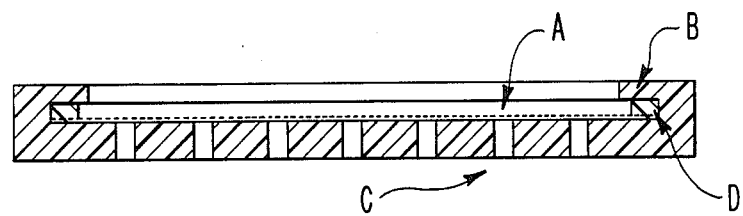
Figure 2:
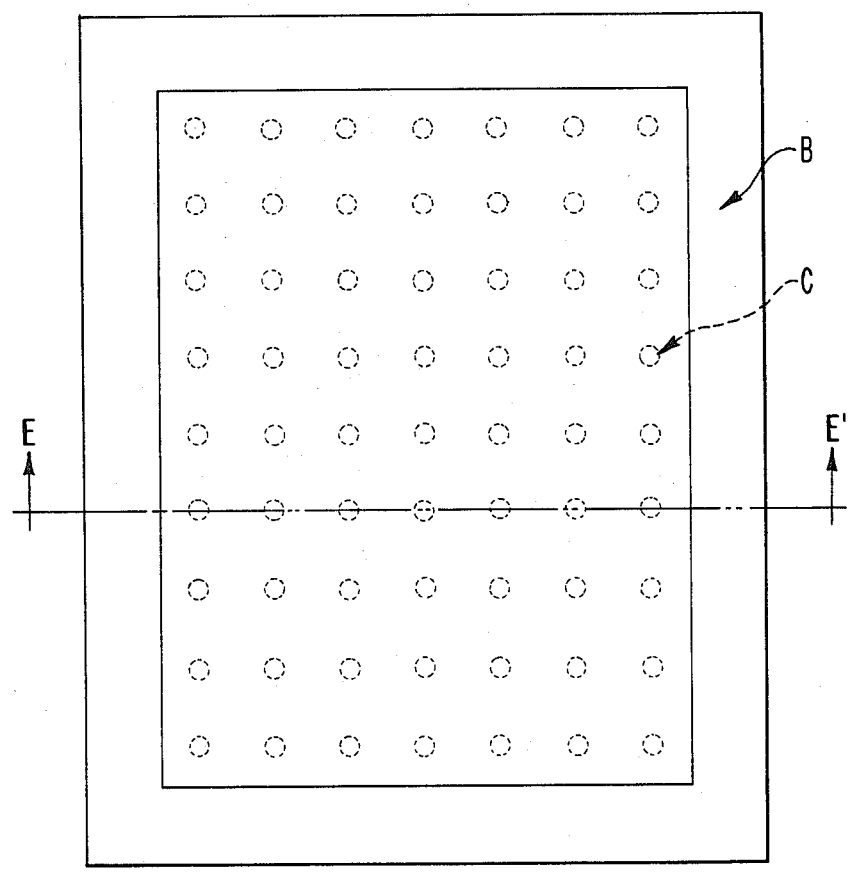

The present invention provides a conveniently processable, castable, two-component polyurethane system formulated for optimal wetting and penetration of the pores and interstices of very small or very fine structures such as the porous polyeric materials disclosed in U.S. Pat. Nos. 4,194,041, 3,953,566, 4,187,390, 4,110,392, 4,482,516, and 4,025,679, which are directed to expanded polytetrafluoro ethylene structure materials. These materials are particularly difficult to wet because of their small pore size (0.20–15 microns) and their low surface energy. Since the present polyurethane system is capable of wetting the expanded polytetrafluoroethylene structures, the systems should be equally useful on other porous plastic or non-plastic materials which are known to be less difficult to wet, such as felted filters, cloths, and mats made from glass fibers or synthetic textiles.

The isocyanate component may be an aliphatic, aromatic, or alicyclic polyisocyanate. Polyisocyanates suitable for use herein include any of the organic polyisocyanates known in polyurethane chemistry, such as tetramethylene diisocyanate; hexamethylene diisocyanate; m-xylene diisocyanate; p-xylene diisocyanate; dimethyl xylene diisocyanate; cyclohexane diisocyanate; dicyclohexyl methane diisocyanate; m-phenylene diisocyante; p-phenylene diisocyanate, 1-alkyl benzene and diisocyanates, such as tolylene and diisocyanate; 3-(-isocyanatoethyl)-phenyl isocyanate; 1-benzyl benzene diisocyanate: 2.6-diethyl benzene diisocyanate: diphenyl methane-diisocyanate: dimethoxy diphenyl methanediisocyanate; and naphthylene-diisocyanate. It is also possible to include trifunctional and higher polyfunctional polyisocyanates provided the final isocyanate functionality does not exceed 2.2. In addition, it is possible to use isocyanates which contain carbodiimide groups, uretdione groups, uretone imine groups and isocyanurate groups. Mixtures of the above-mentioned isocyanates may also be used, as well as isomers and oligomers thereof. The preferred diisocyanates include toluene diisocyanate, methylene diphenylene diisocyanate, or polymeric methylene diphenylene diisocyanates. The various isomers and oligomers of these isocyanates can be selected in various ratios to give different rates of reaction and degree of crosslinking. An example of a preferred diisocyanate is a modified methylene diphenylene diisocyanate polymer (MDI) which has an isocyanate functionality of 2.2, 27.5% free isocyanate groups, and a relatively low reactivity due to the high percentage of 2,4'-isomer present. The isocyanate group on the 2-position being significantly less reactive because of steric hindrance.

The polyol blend of Component B is designed to have a viscosity of 500 cps. or less, preferably 200 cps. or less, and a total hydroxyl functionality of 2.2 or less. The blend consists essentially of a linear polyether or polyester diol having a molecular weight of about 200–2500 and a diol or triol having a molecular weight of less than 200.

Suitable polyether polyols include polyethylene glycols (less than 1000 molecular weight), polypropylene glycols (less than 2500 molecular weight), and polytetramethylene glycols (molecular weights of less than 1000). Polyesters of appropriate viscosity and hydroxyl functionality may also be used. Suitable polyesters include the glycol esters of aliphatic and aromatic dicarboxylic acids, such as glutonic, adipic, terephthalic, and isophthalic (molecular weights of less than 1000).

The equivalent weight of the polyol blend is lowered by the addition of low molecular weight diols or triols. Suitable diols include ethylene glycol, diethylene glycol, triethylene glycol, propylene glycol, dipropylene glycol, tripropylene glycol, butane diol, and hexane diol. Suitable triols include trimethylol propane, hexane triol, glycerne, and butane triol.

It is important that the components have the indicated functionality. Systems with a lower overall functionality will gel at a later point in the reaction than those systems with a high overall functionality. This is described by the equation $P_c = [r + (r)(p)(f-2)]^{-\frac{1}{2}}$.

This equation states that the extent of reaction at which gellation occurs ($P_c$) is inversely proportional to the functionality of the multifunctional component (f), the proportion of the multifunctional component (p), and the stoichiometric balance of the components (r).

$P_c$ is minimized in two component systems by utilizing the least amount of polyfunctional components possible. For example, the formulation described in Example 1 has a $P_c$ of 0.886 (the isocyanate functionality f=2.2 indicates that 20% of the isocyanate is f=3 and 80% is f=2 with p=0.273 and r=1.0).

An additional advantage of this high $P_c$ or low overall functionality polyurethane system is that because the gellation and solidification occurs late in the reaction, when the system is hot from the reactive exotherm, the urethane is stabilized in its expanded state. This minimizes retraction of the urethane from the walls of the container or mold.

In summary, low overall functionality is advantageous in that it provides for optimal wetting of the porous substrate and minimal shrinkage of the polyurethane which improves adhesion to the frame and ensures integrity of the final bond.

Various catalysts for the polyurethane reaction may be added to the polyol component to accelerate curing, including, e.g., metallo-organic salt catalysts. A metallo-organc salt catalyst is a polyvalent metal salt of an organic acid having up to about 18 carbon atoms and being void of active hydrogen atoms. The organo portion of the salt may be either linear or cyclic and saturated or unsaturated. The polyvalent metal has a valence from about 2 to 4. Typical metallo-organic salts include various tin, lead, bismuth and mercury salts and any other metallo-organic catalysts such as 2-ethyl-hexoate, lead naphthenate, dibutyltin dilaurate, dibutyltin-di-2-ethylhexoate, di-(phenyl mercury)dodecyl succinate, dibutyltin-bis lauryl mercaptide and the like. Particularly preferred are tin compounds, e.g., stannous octoate and dibutyltin dilaurate.

Selected siloxanes may be added and are a preferred additional component when the polyol blend has a higher viscosity (about 200–500 cps.). They act as surfactants and improve the wetting. Suitable polyethylene glycol-terminated siloxanes include those which have at least 50% polydimethylsiloxanes which have a hydroxyl functionality of 2 or 3 per molecule and a viscosity of about 100–1000 cps. They are used in an effective amount, typically about 0.1 to 2.5%, based on the weight of the polyol blend. They may be added to either components A or B or added separately.

Non-reactive components such as inert fillers, e.g. glass beads or chopped glass fiber may be added to improve properties and lower the cost of the polyurethane casting system. In some cases it may be preferable to color the casting system with pigments such as titanium dioxide or copper phthalocyanine. Maintaining low moisture contents in the polyol blend can be aided by incorporation of water absorbers such as zeolites. Some applications require reduced flammability and this can be achieved with flame retardant additives such as decabromo bisphenol A. Ultraviolet stabilizers may be added to retard darkening of the polyurethane due to exposure to ultraviolet light. Anti oxidants such as the hindered amines also can be added to help retard the discoloration of the polyurethanes. These additives are incorporated into the polyol component.

The polyol component may be mixed and degassed by one of several techniques. A stream of 0.4 liter of dry nitrogen/minute/liter of the polyol blend at 98° C. reduces the moisture content from 0.206% to 0.110% in 2 hours. The gas is introduced into a closed mixing vessel. Alternatively, a vacuum of 1 torr is applied for several days at room temperature or for several hours at 80°–120° C. A thin-film stripper may be used with equivalent results.

Once the polyol is degassed, it is imperative that water be scrupulously excluded. Moisture contamination results in bubble formation in the final reaction product, or even foaming in severe cases of contamination. Contamination can be avoided by use of a dispensing system which prevents ingress of moisture to the remaining polyol in the containers. Such a system comprises two fittings sized to fit standard container holes. One hole contains a valve tube which extends to the bottom of the container for removal of nearly all the polyol stored in the container. The other hole contains a tube which admits air through a drying tube to replace the volume as the polyol is removed. The drying tube contains a drying agent or desiccant. Conventional dessicants are adequate to remove the moisture from the air admitted to the containers. A typical dessicant is "Drierite" manufactured by W. A. Hammond Drierite Company.

The blended and degassed polyol component can now be mixed with the isocyanate component in commercially available mixing equipment and the mixture dispensed into the mold or around the material to be cast. The gel time can be adjusted from approximately 15 seconds to 10 minutes at room temperature by raising or lowering the catalyst level in the mixture. The heat of reaction typically is adequate to raise the temperature of the reactants sufficiently to initiate cure of the polyurethane product at room temperature without the use of an oven.

Expanded polytetrafluoroethylene film of the type shown, for example, in U.S. Pat. No. 4,187,390 is used to fabricate filter media with or without other components. The high void volume provides free space for fluid flow at low pressure drop and with longer filter life. The filter medium is very flexible and is at the same time very strong, providing excellent resistance to stresses applied during service.

The filter assembly is constructed from a supported or unsupported expanded polytetrafluoroethylene film. This film is adhered to a frame by casting the polyurethene system into the edges of the film. The assembly is then convienently attached for use in a filtration application. The frame can be made from several materials e.g., a metal such as stainless steel or a plastic such as rigid polyvinyl chloride. A variety of geometries of the membrane and housing are possible.

For some uses, the elements are fabricated in controlled environments to assure cleanliness. A metal housing or end caps, such as stainless steel, can also be used. Filter cartridges using expanded polytetrafluoroethylene film filter media have found extensive use in the pharmaceutical and semi-conductor industries both for air filtration and for filtration of deionized water and corrosive chemicals.

The following test procedures were used:

Micro Wetting Test

This test is carried out on an expanded polytetrafluoroethylene structure (PTFE) membrane bonded to a non-woven polyester backing. The expanded PTFE membrane is characterized by a Frazer number of 6 feet per minute ½ inch of water back pressure (ASTM D737). The polyester weighs 2.9 oz/yd². The test is carried out at room temperature and standard atmospheric conditions. The membrane is laid on a horizontal surface. A drop of the test liquid (about 0.02 mls.) is placed on the membrane and the time required for the drop to wet and penetrate the membrane, and completely disappear as a droplet is measured. The material to be tested should be of a constant viscosity and surface tension. Hence, the two component polyurethane system should be tested in the uncatalyzed state since progress of the polyurethane reaction will retard the wetting process. The value reported is the average of five or more observations.

Gel Test

Gel times are measured after mixing Components A and B in the appropriate ratio such that the total weight is between 20 g and 25 g. The mixture is vigorously stirred in a 50 ml beaker for ten seconds. The gel time is defined as the time at which the mixture will not drip off of a ⅛-inch diameter stainless steel rod when it is removed from the mixture.

Viscosity Test

The viscosity measurements are determined with a Brookfield viscometer, model LVF using spindle #2 at 30 rpm at 20°-22° C. bulk temperature of the material.

In the examples which follow all parts are by weight.

EXAMPLE 1

Component A consisted of 100 parts of a mixture of aromatic polyisocyanates derived from methylene diphenyl diisocyanate having an isocyanate functionality of 2.2 and a free isocyanate content of 27.3%. Component B was prepared by mixing 82.9 parts of polypropylene glycol 425, 17.0 parts of dipropylene glycol, and 0.1 part of dibutyl tin dilaurate and then degassing the mixture at 1 mm. Hg at 100° C. for 8 hours. The glycol blend (Component B) had a viscosity of 90 cps. at 20° C. and a wetting time of 25 seconds.

Components A and B were mixed in a 1:1 weight ratio. This mixture had a wetting time of 68 second and a gel time of 90 to 120 seconds. The reaction mixture had a ratio of molar equivalents of isocyanate to hydroxyl 1.0. When cured, the polyurethane was a transparent brown solid with tensile modulus of 7900, tensile strength of 685 Psi, elongation of 12%, and a Shore A hardness of greater than 95.

EXAMPLE 2

Component A was the same mixture of aromatic polyisocyanates used in Example 1. Components B consisted of a degassed mixture of 69.2 parts of polypropylene glycol 425, 30.8 parts of dipropylene glycol, and 0.1 part of dibutyltin dilaurate. This polyol blend had a viscosity of 110 cps. at 20° C. and a wetting time of 26 seconds.

Components A and B were mixed in a 1:1 ratio by volume (1.21:1 ratio by weight). This mixture had a wetting time of 45 seconds and a gel time between 90 to 120 seconds. The reaction mixture had a molar equivalent ratio of isocyanate to hydroxyl of 1.02. The cured polyurethane was a transparent brown solid with a Shore A hardness greater than 95.

EXAMPLES 3-5

Component A was the same as in Example 1. Component B was a mixture of various polyols and diols as shown below.

| | Component B | | | |
|---|---|---|---|---|
| Ex. No. | Polyol | Diol | Polyol:Diol Wt. Ratio | Viscosity of Polyol and Diol Blend (cps.) | Mix Ratio A/B (wt.) |
| 3 | PPG 1025 | DPG | 57.1:49.2 | 170 | 1.17:1 |
| 4 | PTMG 250 | BDO | 99.7:0.3 | 150 | 1.23:1 |
| 5 | PTMG 650 | BDO | 73.8:26.2 | 240 | 1.23:1 |
| 6* | PPG 4025 | DPG | 52.6:47.4 | 570 | 1.17:1 |

*Comparative
PPG is Polypropylene glycol
DPG is dipropylene glycol
PTMG is polytetramethylene glycol
BDO is butane diol The samples were prepared as described in Example 2. The effect of adding several polyethylene oxide terminated polydimethylsiloxane surfactants to the polyol blend was evaluated. The siloxanes were added at 1% by weight based on the polyol component. Siloxane I and II are polyethylene glycol terminated polydimethylsiloxanes. Siloxane I consists of 70% polydimethylsiloxane and has a hydroxyl functionality of 3 and an equivalent weight of about 400. Siloxane II consists of 50% polydimethylsiloxane and has a hydroxyl functionality of 2 and an equivalent weight of about 1200.

The wetting times for the various polyol blends and their admixtures with and without the siloxane surfactants are shown in Table I.

TABLE 1

| | Wetting Times (sec.) | | | |
|---|---|---|---|---|
| | Polyol Blend | Isocyanate + Polyol Blend* | Isocyanate + Polyol Blend + Siloxane I | Isocyanate + Polyol Blend + Siloxane II |
| 2 | 26 | 45 | 25 | 25 |
| 3 | 35 | 43 | 29 | 30 |
| 4 | 52 | 75 | 33 | 34 |
| 5 | 90 | 105 | 43 | 73 |
| 6** | 140 | 133 | 148 | 193 |

*Polyol blend contained no catalyst.
**Comparative

The results show that adding the siloxane surfactants to the mixture of isocyanate plus polyol blend having the required viscosity (less than 500 cps.) reduces the wetting time to about that of the polyol alone or, in some cases, to even less than that of the polyol blend. The results further show that the use of a polyol blend with too high a viscosity (570 cps.) had a wetting time greater than two minutes and that the addition of the surfactants did not improve the wetting time.

EXAMPLE 7

Component A consisted of 51 parts of methylene diphenyl diisocyanate having an isocyanate functionality of 2.0 and a free isocyanate content of 33.6%. Component B consisted of 96.6 parts of polytetramethylene glycol 650, 3.4 parts of trimethylolpropane, 1.0 part of Siloxane I, and 0.1 part of dibutyltin dilaurate. The viscosity of the polyol blend was 440 cps. at 20° C. and the wetting time was 158 seconds, but when mixed with the siloxane surfactant the wetting time was reduced to 73 sec. The components were mixed so as to provide a molar equivalent ratio of isocyanate to hydroxyl of 1.0. The cured polyurethane was a transparent flexible solid with a tensile modulus of 400 psi, elongation of 440%, and tensile strength of 240 psi.

EXAMPLE 8

This example describes the use of the two component polyurethane systems of Example 1 or 2 to prepare a filtration assembly which can be used for the filtration of gaseous or liquid streams.

A rectangular sheet (4 in. by 5 in.) of an expanded polytetrafluoroethylene, such as that described in U.S. Pat. No. 4,187,390, is bonded to a polyester or polypropylene textile support. It is placed in a rectangular frame constructed from rigid polyvinyl chloride. The frame has ⅛ inch diameter holes drilled in the bottom on ½ inch centers to permit flow of fluid through the frame. Each edge of the frame has a flanged lip. The frame is stood on an edge and the polyurethane mixture is poured into the cavity formed by the flanged lip. The polyurethane should wet and penetrate the expanded polytetrafluoroethylene sheet and the textile support within 120 seconds and should harden within 10 minutes. The frame is then rotated ninety degrees and the process is repeated until all four sides are potted.

The film has a thickness of 0.0015 inch, an average pore size of 15 microns, and a microstructure of nodes interconnected by fibrils as shown in the above cited patent. The backing weighed 2.9 oz/yd.$^2$.

What is claimed is:

1. A two component polyurethane composition for casting a supported or unsupported, expanded polytetrafluoroethylene structure, the polyurethane system being capable of wetting the polytetrafluoroethylene structure in about two minutes or less, the system consisting essentially of:
   Component A which is a polyisocyanate having an isocyanate functionality of 2.2 or less; and
   Component B which is a polyol blend having a total hydroxyl functionality of 2.2 or less and having a viscosity of less than 200 cps., which consists essentially of:
   (i) a linear polyether or polyester diol having a molecular weight of about 200–2500,
   (ii) a diol or triol having a molecular weight of less than 200, and
   (iii) a catalyst for the isocyanate-hydroxyl reaction to form the polyurethane, the catalyst being present in an amount sufficient to provide gelling at greater than about 2 minutes and less than about 10 minutes; with the amounts of Component A and Component B which are mixed to form the polyurethane being sufficient to provide a molar equivalent isocyanate to hydroxyl ratio between about 0.95:1 and about 1.10:1.

2. A two component polyurethane composition for casting a supported or unsupported, expanded polytetrafluoroethylene structure, the polyurethane system being capable of wetting the expanded polytetrafluoroethylene structure in about 2 minutes or less, the system consisting essentially of:
   Component A which is a polyisocyanate having an isocyanate functionality of 2.2 or less;
   Component B which is a polyol blend having a total hydroxyl functionality of 2.2 or less and having viscosity of less than 500 cps., which consists essentially of:
   (i) a linear polyether or polyester diol having a molecular weight of about 200–2500,
   (ii) a diol or triol having a molecular weight of less than 200, and
   (iii) a catalyst for the isocyanate-hydroxyl reaction to form the polyurethane, the catalyst being present in an amount sufficient to provide gelling at greater than about 2 minutes and less than about 10 minutes; with the amounts of Component A and Component B which are mixed to form the polyurethane being sufficient to provide a molar equivalent isocyanate to hydroxyl ratio between 0.95:1 and 1.10:1; and
   an effective amount of a polyethylene glycol-terminated siloxane surfactant being added separately or to Component A or B, the surfactant being at least 50% polysiloxane and having a hydroxyl functionality of 2 or 3 per molecule and a viscosity of about 100–1000 cps.

3. The polyurethane composition of claim 2, wherein the linear polyether diol of (i) is polypropylene glycol or a polytetramethylene glycol.

4. The polyurethane composition of claim 2, wherein the diol of (ii) is dipolypropylene glycol or butane diol or wherein the triol of (ii) is trimethylolpropane.

5. The polyurethane composition of claim 2, wherein the catalyst is stannous octoate or dibutyl tin laurate.

6. The polyurethane composition of claim 2, wherein the linear polyether diol of (i) is a polypropylene glycol having a molecular weight of about 400–1100 and wherein the diol of (ii) is dipropylene glycol.

7. The polyurethane composition of claim 2, wherein the linear polyether diol of (i) is polytetramethylene glycol having a molecular weight of about 250–1000.

8. The polyurethane composition of claim 7, wherein the catalyst is dibutyl tin dilaurate.

9. The polyurethane composition of claim 6, wherein the wetting time is about 20–30 seconds and wherein the viscosity of the polyol blend is about 100–150.

10. The polyurethane composition of claim 2, wherein the expanded polytetrafluoroethylene structure is supported.

11. The polyurethane composition of claim 2, further consisting essentially of an inert filler, a pigment, a moisture absorbent, a fire retardant, an ultraviolet stabilizer, an antioxidant or mixtures thereof.

12. A method for casting a supported or unsupported, expanded polytetrafluoroethylene structure, which comprises the steps of:
   (a) wetting the expanded polytetrafluoroethylene structure and, when present, the support with a mixture of a two component polyurethane composition which consists essentially of:
   Component A which is a polyisocyanate having an isocyanate functionality of less than 2.2; and
   Component B which is a polyol blend having a total hydroxyl functionality of 2.2 or less and having a viscosity of less than 200 cps., which consists essentially of:
   (i) a linear polyether or polyester diol having a molecular weight of about 200–2500,
   (ii) a diol or triol having a molecular weight of less than 200, and
   (iii) a catalyst for the isocyanate-hydroxyl reaction to form the polyurethane, the catalyst being present in an amount sufficient to provide gelling at greater than about 2 minutes and less than about 10 minutes; with the amount of Component A and Component B which are mixed to form the polyurethane being sufficient to provide a molar equivalent isocyanate to hydroxyl ratio between 0.95:1 and 1.10:1; characterized in that the wetting of the expanded polytetrafluoroethylene structure and the support when present takes place in 2 minutes or less; and (b) curing the polyurethane system.

13. A method for casting a supported or unsupported expanded polytetrafluoroethylene structure, which comprises the steps of:

(a) wetting the expanded polytetrafluoroethylene structure and, when present, the support with a mixture of a two component polyurethane composition which consists essentially of:

Component A which is a polyisocyanate having an isocyanate functionality of less than 2.2; and Component B which is a polyol blend having a total hydroxyl functionality of 2.2 or less and having a viscosity of less than 500 cps., which consists essentially of:

(i) a linear polyether or polyester diol having a molecular weight of about 200-2500, (ii) a diol or triol having a molecular weight of less than 200, and (iii) a catalyst for the isocyanate-hydroxyl reaction to form the polyurethane, the catalyst being present in an amount sufficient to provide gelling at greater than about 2 minutes and less than about 10 minutes; with the amounts of Component A and Component B which are mixed to form the polyurethane being sufficient to provide a molar equivalent isocyanate to hydroxyl ratio between 0.95:1 and 1.10:1; and with an effective amount of a polyethylene glycol-terminated siloxane surfactant being added separately or to Component A or B, the surfactant being at least 50% polydimethylsiloxane and having a hydroxyl functionality of 2 or 3 per molecule a viscosity of about 100-1000 cps.; characterized in that the wetting of the expanded polytetrafluoroethylene structure and the support when present takes place in 2 minutes or less and (b) curing the polyurethane system.

14. The method of claim 12 or 13, wherein the wetting takes Place in about 30 to 120 seconds.

15. The method of claim 12 or 13, wherein the curing initiates at room temperature.

16. A cast article of manufacture comprising a supported or unsupported, expanded polytetrafluoroethylene structure and a mixture of two component polyurethane composition consists essentially of:

Component A which is a polyisocyanate having an isocyanate functionality of 2.2 or less; and Component B which is a polyol blend having a total hydroxyl functionality of 2.2 or less and having a viscosity of less than 200 cps., which consists essentially of:

(i) a linear polyether or polyester diol having a molecular weight of about 200-2500, (ii) a diol or triol having a molecular weight of less than 200, and (iii) a catalyst for the isocyanate-hydroxyl reaction to form the polyurethane, the catalyst being present in an amount sufficient to provide gelling; with the amounts of Component A and Component B which are mixed to form the polyurethane being sufficient to provide a molar equivalent isocyanate to hydroxyl ratio being about 0.95:1 and about 1.10:1.

17. A cast article of manufacture comprising a supported or unsupported, expanded polytetraflouroethylene structure and a mixture of a two component polyurethane composition which consists essentially of:

Component A which is a polyisocyanate having an isocyanate functionality of less than 2.2; and Component B which is a polyol blend having a total hydroxyl functionality of 2.2 or less and having a viscosity of less than 500 cps., which consists essentially of:

(i) a linear polyether or polyester diol having a molecular weight of about 200-2500, (ii) a diol or triol having a molecular weight of less than 200, and (iii) a catalyst for the isocyanate-hydroxyl reaction to form the polyurethane, the catalyst being present in an amount sufficient to provide gelling with the amounts of Component A and Component B which are mixed to form the polyurethane being sufficient to provide a molar equivalent isocyanate to hydroxyl ratio between 0.95:1 and 1.10:1; and with an effective amount of a polyethylene glycol-terminated siloxane surfactant being added separately or to Component A or B, the surfactant being at least 50% polydimethylsiloxane and having a hydroxyl functionality of 2 or 3 per molecule a viscosity of about 100-1000 cps.

18. The article of claim 16 or 17, wherein the cast article is a potted expanded polytetrafluoroethylene structure further comprising a housing adhered thereto by the polyurethane mixture.

19. The article of claim 18, wherein, in the polyurethane composition, Component A is methylene diphenyl diisocyanate having an isocyanate functionality of 2.2 and free isocyanate content of 27.3% and Component B is the polyol blend where the linear diol is polypropylene glycol having a molecular weight of about 400-1100 and wherein the diol is dipropylene glycol.

20. The article of claim 19, wherein the housing is a metal or a plastic housing.

21. The article of claim 20, wherein the housing is rigid polyvinyl chloride and wherein the expanded polytetraflouroethylene is supported on a polyester backing, wherein the polytetrafluoroethylene, and polyester is adhered to at least one side of the housing by wetting the expanded polytetrafluoroethylene, the polyester backing, and the polyvinyl chloride housing with the polyurethane mixture and curing.

22. The article of claim 21, wherein the assembly is adhered to all sides of the housing.

23. The article of claim 19 wherein the potted article further comprises a separate inner support for the expanded polytetrafluoroethylene structure.

24. The article of claim 16 or 17, wherein the cast article is a molded expanded polytetrafluoroethylene structure.

25. The article of claim 16 or 17, wherein the cast article is an expanded encapsulated polytetrafluoroethylene structure.

26. The polyurethane composition of claim 1, wherein the linear polyether diol of (i) is polypropylene glycol or a polytetramethylene glycol.

27. The polyurethane composition of claim 1, wherein the diol of (ii) is dipolypropylene glycol or butane diol or wherein the triol of (ii) is trimethylolpropane.

28. The polyurethane composition of claim 1, wherein the catalyst is stannous octoate or dibutyl tin laurate.

29. The polyurethane composition of claim 1, wherein the polyether diol of (i) is a polypropylene glycol having a molecular weight of about 400–1100 and wherein the diol of (ii) is dipropylene glycol.

30. The polyurethane composition of claim 1, wherein the linear polyether diol of (i) is polytetramethylene glycol having a molecular weight of about 250–1000.

31. The polyurethane composition of claim 30, wherein the catalyst is dibutyl tin dilaurate.

32. The polyurethane composition of claim 29, wherein the wetting time is about 20–30 seconds and wherein the viscosity of the polyol blend is about 100–150.

33. The polyurethane composition of claim 1, wherein the expanded polytetrafluoroethyl structure is supported.

34. The polyurethane composition of claim 1, further consisting essentially of an inert filler, a pigment, a moisture absorbent, a fire retardant, an ultraviolet stabilizer, an antioxidant or mixtures thereof.

* * * * *